United States Patent [19]

Fushiki et al.

[11] 4,407,999

[45] Oct. 4, 1983

[54] WATER REPELLENT ADHESIVE COMPOSITION FOR WOODEN MATERIAL

[75] Inventors: Takeshi Fushiki, Yokohama; Tohru Tagawa, Machida; Satoru Kawakami, Urawa, all of Japan

[73] Assignee: Mitsubishi Chemical Industries Ltd., Tokyo, Japan

[21] Appl. No.: 383,037

[22] Filed: May 28, 1982

[30] Foreign Application Priority Data

Feb. 25, 1980 [JP] Japan .................................. 55-22522

[51] Int. Cl.$^3$ ............................................. C08L 91/06
[52] U.S. Cl. ................................... 524/276; 524/279; 524/487; 524/489; 524/596; 524/598
[58] Field of Search ............... 524/276, 279, 487, 489, 524/596, 598

[56] References Cited

U.S. PATENT DOCUMENTS

3,373,127 3/1968 Bean, Jr. et al. .................... 524/487
4,104,698 8/1978 Murata et al. ...................... 524/279

FOREIGN PATENT DOCUMENTS

6118475 9/1981 Japan .................................. 524/276

*Primary Examiner*—Melvyn I. Marquis
*Attorney, Agent, or Firm*—Oblon, Fisher, Spivak, McClelland & Maier

[57] ABSTRACT

Water-repellent adhesive composition for wooden material which consists essentially of a paraffin emulsion and a resin material selected from the group consisting of urea resin, urea-melamine resin, and phenol resin, wherein said paraffin emulsion contains oxidized paraffin.

18 Claims, No Drawings

WATER REPELLENT ADHESIVE COMPOSITION FOR WOODEN MATERIAL

BACKGROUND OF THE INVENTION

1. Field of the Invention

This invention relates to a water repellent adhesive composition for wooden material which consists of a particular paraffin emulsion and a resin component such as urea resin, urea-melamine resin, or phenol resin. More particularly, the invention is concerned with a single liquid type adhesive composition which is excellent in blendability and storage stability, and, moreover, is capable of imparting high degree of water-repellent property to the wooden material to be joined together.

2. Description of the Prior Art

There have so far been known, as the adhesive agent for wooden material, various resins such as urea resin, urea-melamine resin, phenol resin, and so on. Wooden materials such as particle board, fiber board, etc. obtained by using such adhesive agent, however, cannot be said to have sufficient water-resistant property, hence their utility has been fairly limited. With a view to pushing through this impasse, there has been proposed co-use of a water-repellency imparting agent such as paraffin emulsion, and so forth. However, when the conventional paraffin emulsion is mixed beforehand with an adhesive agent such as urea resin, etc. to prepare a single liquid type water-repellent adhesive composition, there takes place a segregation phenomenon in the mixture in several hours, or in a few days at the longest, which renders the blending stability of the mixture to be extremely poor. Such instability would also bring about a problem of non-uniformity in the water-repellent property in the wooden material as joined. To avoid such problem, therefore, it has so far been an established practice to adopt a method, in which, at the time of applying or coating the adhesive agent on wooden pieces, wood cuttings fiber dusts, chips, etc., the paraffin emulsion is additionally added or applied to these materials. Accordingly, in the course of manufacturing the wooden materials, the adhesive agent and the water-repellent agent should be stored in separate storage vessels for each of them, which leaves a problem in rationalization of the manufacturing steps.

SUMMARY OF THE INVENTION

In view of such circumstances, the present inventors have so far made diligent and strenuous studies and researches, as the result of which they have found out that, when the paraffin emulsion containing oxidized paraffin as the water-repellent property imparting agent is used, the emulsion is superior in its blendability and storage stability which is from several tens to a few hundred times as high as the conventionally used paraffin emulsion, and is capable of imparting sufficient water-repellent property to the wooden material as joined, in spite of its being of a single liquid type. Based on this finding, they have made the present invention.

That is to say, the gist of the present invention resides in a water-repellent adhesive composition for wooden material consisting essentially of a paraffin emulsion and a resin component such as urea resin, urea-melamine resin, or phenol resin, wherein the paraffin emulsion contains oxidized paraffin.

The foregoing object, other objects, and specific components to constitute the water-repellent adhesive composition for wooden material according to the present invention, and the manner of preparing the same will become more apparent and understandable from the following detailed description thereof when read in conjunction with several preferred examples to enable those skilled in the art to put the invention into practice.

DETAILED DESCRIPTION OF THE PREFERRED EMBODIMENTS

Explaining the present invention in specific details in the following, the inventive paraffin emulsion contains, as its constituent elements, paraffin type hydrocarbon and oxidized paraffin.

The paraffin type hydrocarbons for use in the present invention should be those that do not cause evaporation and scattering during the hot-press forming process of the wooden material. Besides these, any kind of hydrocarbons that is capable of existing properly throughout the wooden material to impart favorable water-repellent property to the material can be used. Usually, those paraffin type hydrocarbons having a melting point range of from 40° to 80° C., or preferably from 50° to 70° C., are used.

For oxidized paraffin, those having an acid value of from 10 to 70 and a melting point of from 30° to 90° C. are used preferably. In particular, oxidized paraffin having the acid value of from 20 to 45 and the melting point of from 40° to 80° C. is preferable. If the acid value of the oxidized paraffin is too small, the emulsification becomes difficult, which lowers the storage stability of the resulting emulsion per se, hence inferior blendability with the resin component for the adhesive agent and its storage stability. On the contrary, if the acid value is too large, the water-repellency imparting property of the adhesive composition becomes lowered.

The mixing quantity of the abovementioned paraffin type hydrocarbon and oxidized paraffin may be appropriately selected from a range of the oxidized paraffin, which is from 3 to 50 parts by weight, or preferably from 5 to 30 parts by weight, with respect to the paraffin type hydrocarbon, which is from 50 to 97 parts by weight, or preferably from 70 to 95 parts by weight.

A difference in the melting point between the paraffin type hydrocarbon and the oxidized paraffin should preferably not exceed 20° C. in consideration of the miscibility between the emulsion and the adhesive resin component and the storage stability of the adhesive composition.

The paraffin emulsion of the present invention is obtained by emulsifying the abovementioned paraffin type hydrocarbon and oxidized paraffin in the presence of a surfactant and/or a water-soluble alkaline alkali metal compound, ammonia water, or morpholine (hereinafter simply referred to as "water-soluble alkali compound").

For the surfactant, there may be used any type of surfactants, i.e., anion type, nonion type, cation type and amphoteric type surfactants. Concrete examples of these surfactants are; anionic type surfactants such as sodium oleate soap, potassium fatty acid soap, lauryl sodium sulfate, alkylbenzene sulfonate, alkylnaphthalene sulfonate, polyoxyethylene alkylether sulfonate, alkyl amine oxide, and so on; nonionic type surfactants such as polyethylene glycol alkyl ether, polyethylene glycol, polypropylene glycol ether, polyethylene glycol fatty acid ester, sorbitan fatty acid ester, polyethylene glycol sorbitan fatty acid ester, sucrose fatty acid ester, glycerine fatty acid ester, and so forth; cation type surfactants such as alkyl amine, polyoxyethylene alkylamine, alkylamine acetate, alkylamine hydrochlorate, alkyl trimethyl ammonium chloride, alkyl picolinium chloride, and so on; and amphoteric type surfactants such as alkyl glycine, alkyl betaine, alkyl imidazoline, and so forth. Particularly preferred are nonionic and cationic type surfactants.

In view of the fact that oxidized paraffin is used for the purpose of the present invention, the surfactant may be very small in amount in comparison with that used in ordinary emulsification. Usually, it is sufficient to use 0 to 5% by weight of such surfactent with respect to the total quantity of the abovementioned paraffin type hydrocarbon and oxidized paraffin.

Concrete examples of water-soluble alkali compound are: water-soluble alkaline alkali metal compounds such as lithium hydroxide, sodium hydroxide, potassium hydroxide, lithium carbonate, sodium carbonate, potassium carbonate, and so forth; and ammonia water; amines and morpholine. These water-soluble alkali compounds may used in an appropriate quantity in accordance with a pH value of the adhesive agent and its gelling time. The quantity is usually selected from a range sufficient to neutralize the acid radical present in the oxidized paraffin at a ratio of from 0 to 300%, or preferably, from 40 to 130%. When the abovementioned surfactant is not used, the acid radical in the oxidized paraffin should essentially be neutralized, in which case a range of from 40 to 150%, or preferably from 50 to 130%, of the acid radical should preferably be neutralized.

The emulsifying method may be selected from a homogenizing mixer, a valve homogenizer, a colloid mill, an ultra-sonic wave emulsifier, and other mechanical emulsifying methods, as well as the phase converting emulsifying method, and so on. The emulsification may usually be carried out sufficiently at a temperature higher, by 50° to 10° C. or above, than the melting point of the paraffin type hydrocarbon and the oxidized paraffin to be used and for a time period of from ten minutes to three hours.

The paraffin emulsion according to the present invention may also be used together with water-soluble synthetic high polymer compounds such as polyvinyl alcohol, polyethylene imine, polyacryl amide, polyacrylic acid, and so on; cellulose derivatives such as methyl cellulose, hydroxyethyl cellulose, hydroxypropyl cellulose, and so on; and natural high polymer compounds such as starch, gum arabic, guar gum, locust bean gum, sodium alginate, and so forth.

The adhesive resin used for the present invention may be selected from urea resin, urea-melamine resin, and phenol resin. Usually, any kind of resins, which are used for joining wooden materials, are feasible for the purpose of the present invention.

Urea resin can be obtained by reacting urea and a formaldehyde donor such as formalin, paraformaldehyde, etc., at a mol ratio of a range of from 1:1.1–2, in the presence of an acid catalyst such as formic acid and an alkaline catalyst such as ammonia water, sodium hydroxide, etc. under a well known process. Such urea resin usually contains a non-volatile component of from 50 to 70% by weight, and has its viscosity of from about 10 to 600 cp. (centipoise).

Urea-melamine resin is obtained by reacting urea, melamine, and a formaldehyde donor at a mol ratio among them in a range of from 1:0.1–0.4:1.5–3 under the abovementioned conditions. The thus obtained urea-melamine resin usually contains a non-volatile component of from 50 to 70% by weight, and has its viscosity of from about 10 to 600 cp.

Phenol resin is obtained by reacting phenols such as phenol, cresol, xylenol, etc. and a formaldehyde donor at a mol ratio in a range of 1:1.5–3 in the presence of alkaline catalyst such as sodium hydroxide, etc. under a well known process. The thus obtained phenol resin usually contains a non-volatile component of from 35 to 50% by weight, and has its viscosity of from about 50 to 600 cp.

The adhesive composition of the present invention can be prepared by mixing the abovementioned paraffin emulsion and urea resin (or urea-melamine resin, or phenol resin) at a weight ratio between them in a range of from 0.5:99.5 to 20:80, or preferably, from 1:99 to 10:90. In this case, it should be understood that the quantities of the adhesive resin and paraffin emulsion are in terms of their solid content by conversion. If the quantity of the paraffin emulsion is too small, its water-repellency imparting property to the wooden material as joined becomes lowered. On the contrary, if the quantity is too large, various mechanical properties of the wooden material as joined are unfavorably impaired.

For the method of blending the paraffin emulsion and the adhesive resin, there is no particular device required. Usually, they may be simply blended in an ordinary blending vessel with an agitator under a normal pressure, at a temperature of from normal temperature to 60° C., for a time period of from ten minutes to six hours or so. It is preferable in this case that the paraffin emulsion be dripped into the vessel during the blending. At this time, there may also be added, depending on necessity, various well known additives such as a viscosity adjusting agent, an extending agent, a filling agent, and so on.

The thus obtained adhesive composition according to the present invention could maintain its stability at a normal temperature for 10 to 40 days without segregation and coagulation, and exhibit excellent water-repellent property.

In the following, the present invention will be explained more concretely with reference to several preferred embodiments. Incidentally, note should be taken that, in the following examples, "part(s)" and "%" are meant by "part(s) by weight" and "% by weight", unless otherwise specified.

MANUFACTURING EXAMPLE 1

Preparation of Paraffin Emulsion

A. Paraffin Emulsion A of the Present Invention:

| | |
|---|---|
| Paraffin having a melting point of 52° C. | 90 parts |
| Oxidized paraffin having an acid value of 28 and melting point of 67° C. | 10 parts |
| Sodium hydroxide | 0.2 part |
| Sorbitan monostearate | 0.25 part |
| Polyethylene glycol oleyl ether | 0.75 part |
| Deionized water | 125 parts |

The above-listed ingredients were charged in a emulsifying vessel, warmed to a temperature of 75° C., and emulsified, while vigorously agitating the batch with a homogenizer, thereby obtaining the paraffin emulsion A having a solid content of 44.7%.

B. Paraffin Emulsion B for Comparative Example:

The same procedures as in A above were followed with the exception that the oxidized paraffin and sodium hydroxide were not used, and that the quantity of paraffin was made 100 parts, thereby obtaining the paraffin emulsion B having a solid content of 44.7%.

C. Paraffin Emulsion C for Comparative Example:

The same procedures as in B above were followed with the exception that sorbitan monostearate used in B was made 2.5 parts, polyethylene glycol oleyl ether was made 7.5 parts, both being made ten times as large as in the previous ones, and the quantity of deionized water was made 135 parts, whereby the paraffin emulsion C having a solid content of 44.9% was obtained.

D. Paraffin Emulsion D of the Present invention:

| Paraffin having a melting point of 68° C. | 80 parts |
|---|---|
| Oxidized paraffin having an acid value of 40 and a melting point of 73° C. | 20 parts |
| Sodium hydroxide | 0.27 part |
| Sorbitan monolaurate | 0.3 part |
| Polyethylene glycol tetradecyl ether | 0.7 part |
| Deionized water | 145 parts |

The abovementioned raw material preparation was charged in the emulsifying vessel, warmed to 75° C., and emulsified, while vigorously agitating the reaction mixture with a homogenizer, after which 0.73 part of hydroxy propyl cellulose was added to the reaction mixture to thereby obtain the paraffin emulsion D having a solid content of 41.3%.

E. Paraffin Emulsion E of the Present Invention:

| Paraffin having a melting point of 57° C. | 90 parts |
|---|---|
| Oxidized paraffin having an acid value of 28 and a melting point of 67° C. | 10 parts |
| Sodium hydroxide | 0.2 part |
| Polyoxyethylene oleyl ether | 3.7 parts |
| Monoglyceride stearate | 1.3 parts |
| Deionized water | 125 parts |

The above-listed ingredients were charged in the emulsifying vessel, warmed to a temperature of 80° C., and emulsified, while vigorously agitating the reaction mixture with a homogenizer, thereby obtaining the paraffin emulsion E having a solid content of 45.7%.

F. Paraffin Emulsion F of the Present Invention:

The exactly same procedures were followed as in E above with the exception that saccharose palmitate was used in place of polyoxyethylene oleyl ether in E., and saccharose stearate in place of monoglyceride stearate, whereby the paraffin emulsion F having a solid content of 45.7% was obtained.

G. Paraffin Emulsion G of the Present Invention:

| Paraffin having a melting point of 57° C. | 90 parts |
|---|---|
| Oxidized paraffin having an acid value of 28 and a melting point of 67° C. | 10 parts |
| Ethylene oxide added substance of hexadecyl amine | 5 parts |
| Acetic anhydride | 0.8 part |
| Deionized water | 125 parts |

The above-listed ingredients were charged in the emulsifying vessel, warmed to a temperature of 80° C., and emulsified, while vigorously agitating the batch with a homogenizer, thereby obtaining the paraffin emulsion G having a solid content of 45.8%.

H. Paraffin Emulsion H for Comparative Example:

| Paraffin having a melting point of 57° C. | 90 parts |
|---|---|
| Stearic acid | 10 parts |
| Polyoxyethylene monostearate | 3 parts |
| Triethanolamine | 1 parts |
| Deionized water | 150 parts |

The above-listed ingredients were charged in the emulsifying vessel, warmed to a temperature of 75° C. and emulsified, while vigorously agitating the batch with a homogenizer, thereby obtaining the paraffin emulsion H having a solid content of 40.9%.

I. Paraffin Emulsion I of the Present Invention:

| Paraffin having a melting point of 52° C. | 80 parts |
|---|---|
| Oxidized paraffin having an acid value of 28 and a melting point of 67° C. | 20 parts |
| Sodium hydroxide | 0.4 part |
| Deionized water | 125 parts |

The above-listed ingredients were emulsified in the same manner as in A above, thereby obtaining the paraffin emulsion I having a solid content of 44.5%.

MANUFACTURING EXAMPLE 2 a. Urea Resin a:

100 parts of urea was added to 257 parts of 37% conc. formalin, and both were mixed well under agitation. To this mixture, ammonia water was added to adjust its pH value to 7. The batch was then heated to raise its temperature to 90° C. in 30 minutes, at which temperature the reaction was continued. At a point where the pH value of the reaction liquid gradually lowered to 4.8, sodium carbonate was added to adjust its pH value to 7 with further addition of 26 parts of urea to continue the reaction for about 30 minutes. After this, the reaction liquid was dehydrate and cooled to thereby obtain urea resin a containing approximately 67% of a non-volatile component.

b. Urea-Melamine Resin b:

60 parts of urea and 32 parts of melamine were added to 203 parts of 37% conc. formalin, and they were mixed well under agitation. To this mixture, ammonia water was added to adjust its pH value to 7. The batch was then heated to raise its temperature to 90° C. in 30 minutes, at which temperature the reaction was continued. At a point where the pH value of the reaction liquid gradually lowered to 4.8, sodium carbonate was added to adjust its pH value to 7 with further addition of 15 parts of urea. After sufficient reaction having been conducted, the reaction liquid was dehydrated and cooled to thereby obtain urea-melamine resin b containing approximately 65% of a non-volatile component.

c. Phenol Resin c:

94 parts of phenol was added to 162 parts of 37% conc. formalin, and both were mixed well under agitation. To this reaction mixture, 60 parts of 30% aqueous solution of sodium hydroxide was added, and the batch was heated to elevate its temperature to 90° C. in approximately 60 minutes, at which temperature the reaction was continued. After the reaction for 150 minutes at 90° C., 98 parts of water was added to the reaction system to further continue the reaction for 30 minutes at 90° C. After completion of the reaction, the reaction liquid was cooled, thereby obtaining phenol resin c containing approximately 35% of a non-volatile component.

EXAMPLES 1 TO 9 AND COMPARATIVE EXAMPLES 1 TO 5

The paraffin emulsion and adhesive resin shown in Table 1 below were respectively weighed for predetermined quantities, and were well mixed under agitation to obtain the adhesive composition. The composition was then introduced into a hermetically sealed vessel. The vessel was maintained at a temperature of 20° C., and changes in the outer appearance of the adhesive composition with lapse of time was observed. The evaluation of the result of observation is also shown in Table 1, wherein O denotes no change recognized at all on the outer appearance of the composition; Δ represents the composition which has slightly increased its viscosity or slightly segregated; X indicates the composition which has segregated completely; and  denotes the composition which has coagulated or solidified.

TABLE 1

| | Paraffinic Emulsion | Adhesive Resin | Emulsion Resin (weight ratio) | Storage Stability After 24 hrs | After 48 hrs | After 240 hrs | After 480 hrs |
|---|---|---|---|---|---|---|---|
| Example 1 | A | b | 1/10 | O | O | O | O~Δ |
| Example 2 | D | b | 1/10 | O | O | O | O~Δ |
| Comparative Example 1 | B | b | 1/10 | Δ | X~XX | — | — |
| Comparative Example 2 | C | b | 1/10 | Δ | Δ~X | XX | — |
| Example 3 | A | a | 1/10 | O | O | O | O~Δ |
| Example 4 | E | a | 1/10 | O | O | O~Δ | Δ |
| Example 5 | F | a | 1/10 | O | O | O~Δ | Δ |
| Example 6 | G | a | 1/10 | O | O | O | O~Δ |
| Example 7 | I | a | 1/10 | O | O | O | O~Δ |
| Comparative Example 3 | H | a | 1/10 | O~Δ | X | XX | — |
| Example 8 | A | c | 0.5/10 | O | O | O~Δ | Δ |
| Example 9 | G | c | 0.5/10 | O | O | O~Δ | Δ |
| Comparative Example 4 | C | c | 0.5/10 | XX | — | — | — |
| Comparative Example 5 | H | c | 0.5/10 | XX | — | — | — |

EXAMPLE 10

10 parts of paraffin emulsion A and 90 parts of the adhesive resin a were weighed and placed in two tall beakers, each having 300 cc capacity, and the components were well mixed under agitation, and kept in a hermetically sealed condition at respective temperature levels of 20° C. and 35° C. After lapse of 20 days, the concentration of the solid content in the upper and lower parts in the tall beakers were measured, the results of which are shown in the following Table 2. From this, it was found that the mixture liquid was uniform. Further, variations in viscosity during storage of the mixture liquid at 20° C. (in accordance with B-type viscometer) are as shown in Table 3. No substantial variations in viscosity could be recognized.

TABLE 2

| Storage temperature | Storage period | Concentration of solid content in tall beakers % Upper part | Lower part |
|---|---|---|---|
| 20° C. | 20 days | 64.7 | 63.4 |
| 35° C. | 20 days | 65.4 | 65.0 |

TABLE 3

| Storage time at 20° C. | Viscosity by B-type viscometer (60 rpm/hr.) |
|---|---|
| Immediately after mixing | 2.0 poise |
| After 168 hours | 2.8 poise |
| After 336 hours | 3.1 poise |

EXAMPLE 11

5.5 parts of paraffin emulsion A and 100 parts of adhesive resin a were sufficiently mixed, and the mixture was stored under tight seal for 14 days at 20° C. At the end of the fourteenth day, the mixture liquid was sprayed onto coniferous wood chips at a rate of adhesion of 10% by weight in terms of the solid content of the adhesive composition, followed by hot-press forming of the wooden material under the initial pressure of 30 kg/cm² for 10 minutes at 155° C. As the result of this, there was obtained a single-layered particle board having a thickness of 15 mm and a specific gravity of 0.7. The thus obtained particle board was measured in accordance with JIS A-5908 for its bending strength in an ordinary condition as well as its bending strength in a wet condition, water absorption ratio, and rate of increase in thickness due to water absorption, after the particle board had been immersed in water for 24 hours at 25° C. The results obtained are as shown in Figure 4 below.

COMPARATIVE EXAMPLE 6

The exactly same procedures as in Example 11 above were followed with the exception that the paraffin emulsion C was used in place of the paraffin emulsion A, which was well mixed with the adhesive resin a immediately before before the spraying. The results as shown in Table 4 were obtained. Incidentally, this mixture liquid was found to have been segregated and coagulated to a considerable extent after lapse of 14 days, and to have been impossibly sprayed.

TABLE 4

| | Example 11 | Comparative Example 6 |
|---|---|---|
| Specific gravity of board | 0.7 | 0.7 |
| Bending strength in normal state (Kg/cm²) | 260 | 250 |
| Bending strength in | | |

TABLE 4-continued

|  | Example 11 | Comparative Example 6 |
| --- | --- | --- |
| wet state (kg/cm$^2$) | 175 | 130 |
| Water absorption ratio (%) | 35 | 55 |
| Rate of increase in thickness due to water absorption (%) | 7 | 18 |

We claim:

1. A water-repellent adhesive composition for wooden materials, which consists essentially of:
(1) a paraffin emulsion comprising a paraffin hydrocarbon component which does not evaporate and scatter during hot pressing of wooden material to which the adhesive composition has been applied and an oxidized paraffin component; and
(2) a resin material selected from the group consisting of urea resins, urea-melamine resins and phenol resins.

2. The composition of claim 1, wherein said paraffin emulsion comprises 50–97 parts by weight of a paraffin hydrocarbon and 3–50 parts by weight of said oxidized paraffin.

3. The composition of claim 2, wherein said paraffin hydrocarbon has a melting point range of from 40° to 80° C.

4. The composition of claim 2, wherein said oxidized paraffin has an acid value ranging from 10 to 70 and a melting point of from 30° to 90° C.

5. The composition of claim 4, wherein said oxidized paraffin has an acid value of from 20 to 45 and a melting point of from 40° to 80° C.

6. The composition of claim 1, wherein said paraffin emulsion further comprises a water-soluble synthetic polymer compound, a cellulose derivative or a natural high molecular weight polymeric compound.

7. The composition of claim 1, wherein the emulsifying component of said paraffin emulsion is a surfactant, a water-soluble alkali compound or a mixture thereof.

8. The composition of claim 7, wherein said water-soluble alkali compound is a water-soluble alkaline alkali metal compound, ammonia water or morpholine.

9. The composition of claim 7, wherein said surfactant is an anionic, nonionic, cationic or amphoteric surfactant.

10. The composition of claim 9, wherein said anionic surfactant is sodium oleate soap, potassium fatty acid soap, lauryl sodium sulfate, an alkylbenzene sulfonate, an alkylnaphthalene sulfonate, polyoxyethylene alkyl ether sulfonate, or an alkyl amine oxide.

11. The composition of claim 9, wherein said nonionic surfactant is polyethylene glycol alkylethyer, polyethylene glycol, polypropylene glycol ether, polyethylene glycol fatty acid ester, sorbitan fatty acid ester, polyethylene glycol sorbitan fatty acid ester, sucrose fatty acid ester or glycerine fatty acid ester.

12. The composition of claim 9, wherein said cationic surfactant is an alkyl amine, a polyoxyethylene alkylamine, an alkylamine acetate, an alkylamine hydrochlorate, an alkyl trimethyl ammonium chloride, or an alkyl picolinium chloride.

13. The composition of claim 9, wherein said amphoteric surfactant is an alkyl glycine, an alkyl betaine or an alkyl imidazoline.

14. The composition of claim 7, wherein said paraffin emulsion contains from 0 to 5% by weight of said surfactant.

15. The composition of claim 1, wherein said urea resin contains from 50 to 70% by weight of a non-volatile component and has a viscosity of about 10 to 600 cp.

16. The composition of claim 1, wherein said urea-melamine resin contains from 50 to 70% by weight of a non-volatile component and has a viscosity ranging from 10 to 600 cp.

17. The composition of claim 1, wherein said phenol resin contains from 35 to 50% by weight of a non-volatile component and has a viscosity ranging from 50 to 600 cp.

18. The composition of claim 1, wherein the weight ratio in which said paraffin emulsion and said resin component are mixed ranges from 0.5:99.5 to 20:80.

* * * * *